Patented Sept. 18, 1951

2,568,619

UNITED STATES PATENT OFFICE 2,568,619

PREPARATION OF BETA-HYDROXY MONOCARBOXYLIC ACID ESTERS

James T. Gregory, Cuyahoga Falls, Ohio, assignor to The B. F. Goodrich Company, New York, N. Y., a corporation of New York No Drawing. Application January 4, 1947, Serial No. 720,305

11 Claims. (Cl. 260—484)

This invention relates to a process for the preparation of esters of beta-hydroxy monocarboxylic acids, and particularly to the preparation of esters of hydracrylic acid (also known as beta-hydroxy propionic acid), such as ethyl hydracrylate.

In U. S. Patent 2,356,459, to Frederick E. Küng, an economical method of preparing lactones of beta-hydroxy monocarboxylic acids by the reaction of a ketene with a carbonyl compound such as an aldehyde or ketone is disclosed. The ease with which such lactones are now obtained makes it desirable to use these compounds as starting materials for the synthesis of other compounds including the beta-hydroxy monocarboxylic acid esters, such as esters of hydracrylic acid, which are extremely useful in chemical synthesis, for example in the preparation of polymerizable materials for the production of synthetic resins, synthetic rubber and the like.

It is also disclosed in U. S. Patent 2,352,641 that beta-lactones may be reacted with alcohols in the absence of catalysts or in the presence of acid catalysts to prepare beta-alkoxy carboxylic acids, which may then be converted into unsaturated carboxylic acid esters by dehydration.

I have now discovered that beta-propiolactone may be reacted with alcohols in the presence of an alkaline catalyst to prepare the esters of hydracrylic acid, which esters are extremely useful organic compounds.

It is quite surprising that beta-propiolactone will yield esters of hydracrylic acid in the presence of a basic catalyst since in the presence of an acid catalyst or under neutral conditions, the beta-hydroxy monocarboxylic acid is formed.

The reaction of beta-lactones with alcohols to yield esters of beta-hydroxy monocarboxylic acids according to this invention proceeds substantially as illustrated by the following equation:

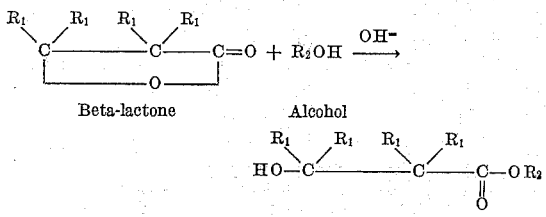

Beta-lactone    Alcohol

Ester of beta-hydroxy carboxylic acid wherein $R_1$ is either hydrogen or a hydrocarbon radical and $R_2$ represents an organic radical preferably a saturated or unsaturated hydrocarbon radical or an organic radical composed only of hydrogen, carbon, and oxygen atoms.

The alcohol which is reacted with beta-propiolactone may be any saturated or unsaturated primary, secondary, or tertiary, mono- or polyhydroxy, substituted or unsubstituted alcohol in which the hydrogen atoms not attached to carbon atoms are present in hydroxy groups. Among these are primary aliphatic alcohols such as methyl alcohol, ethyl alcohol, propyl alcohol, butyl alcohol, amyl alcohol, hexyl alcohol, heptyl alcohol, octyl alcohol, nonyl alcohol, decyl alcohol, undecyl alcohol, dodecyl alcohol, tetradecyl alcohol, allyl alcohol, propargyl alcohol; secondary aliphatic alcohols such as isopropyl alcohol, secondary amyl alcohol, secondary hexyl alcohol, secondary octyl alcohol; tertiary aliphatic alcohols such as tertiary butyl alcohol, tertiary amyl alcohol, tertiary butylcarbinol, aromatic alcohols such as benzyl alcohol, methylphenylcarbinol, phenylethyl alcohol, alicyclic alcohols such as cyclohexanol, heterocyclic alcohols such as furfuryl and tetrahydrofurfuryl alcohols, substituted alcohols such as ethoxyethyl alcohol, ethylene chlorohydrin, cyanohydrin; polyhydroxy alcohols such as glycol, glycerol, and triethylene glycol and the like.

The primary alcohols are the preferred compounds for the reaction of this invention and produce the highest yields. The reaction with secondary, tertiary, substituted and polyhydroxy alcohols proceeds satisfactorily, but at a slower rate, and there is a greater amount of polymerization of the beta-propiolactone and a proportionately decreased yield.

The temperature at which the reaction is conducted is not critical and may be varied considerably. However, very low temperatures in the range of $-70°$ to $+5°$ C. are preferred since these low temperatures retard the tendency for polyester formation by both the beta-propiolactone and the hydracrylate ester, and thus the yield is substantially increased. It has been demonstrated that the process can be carried out at higher temperatures up to room temperature or even higher if the basic catalyst is removed immediately after the reaction is complete. This can be best accomplished by neutralization employing a concentrated acid such as hydrochloric acid, sulfuric acid or ethanolic hydrochloric acid.

The quantities of reactants are likewise not critical and may be varied within wide limits. The highest yields result when the alcohol-beta-propiolactone molar ratio is about 8:1, that is, eight moles of alcohol to one mole of beta-propiolactone but from 1 to 10 moles of alcohol to 1 mole of lactone may be used with good results. The quantity of the alkaline catalyst used may also be varied considerably. It has been shown that when sodium hydroxide is used as the catalyst a ratio of 0.05 mole to eight moles of alcohol and one mole of beta-propiolactone is the optimum amount, but of course amounts as small as 0.01 mole to one mole of lactone or as large as .1 mole or more to one mole of lactone may be employed if desired.

Catalysts which may be used in the reaction described hereinabove include the alkali metal hydroxides such as sodium hydroxide, potassium hydroxide and lithium hydroxide; the alkaline metal alcoholates such as sodium methylate, sodium ethylate and potassium ethylate; quaternary ammonium bases such as tri-methyl benzyl ammonium hydroxide and the like. Other strongly alkaline materials either organic or inorganic or even alkaline materials of lesser basicity such as ammonium hydroxide, sodium carbonate, organic amines, etc. may also be used. Preferably, however, the catalyst is a strong base having a dissociation constant in water solution above $1 \times 10^{-2}$.

The reaction of beta-propiolactone with alcohol to yield an ester of hydracrylic acid is best carried out by dissolving the alkaline catalyst in the alcohol and after cooling to the preferred temperatures hereinabove listed, the beta-propiolactone is added slowly, the mixture being constantly stirred. After the addition of the beta-propiolactone is complete, concentrated acid is added to neutralize the catalyst. The salt formed is then filtered off. Then the unreacted alcohol is distilled off and the product purified by distillation at reduced pressures, and the product from this distillation is found to be an ester of hydracrylic acid.

The following examples will illustrate the practice of the invention but are not intended to limit the invention thereto, for numerous modifications in the particular compounds and conditions employed will be obvious to those skilled in the art.

Example I 6 grams of sodium hydroxide were dissolved in 800 grams (25 moles) of methyl alcohol. This mixture was cooled to a temperature of −10° C. 216 grams (3 moles) of beta-propiolactone were then added with constant stirring. After allowing the mixture to warm to 5° C., 12 cc. of concentrated hydrochloric acid were added to neutralize the catalyst. The salt formed was then filtered off. The unreacted methyl alcohol was then distilled off and the product was distilled at reduced pressures. 266 grams (85.3% yield) of methyl hydracrylate (B. P. 19 mm: 80° to 83° C.) were formed.

Example II 9 grams of sodium hydroxide were placed in 928 grams (16 moles) of allyl alcohol. The mixture was cooled to a temperature of −40° C. and then 144 grams (2 moles) of beta-propiolactone were added slowly with constant stirring. After the addition of the beta-propiolactone was complete, 25 cc of concentrated hydrochloric acid were added to neutralize the catalyst. The salt formed was then filtered off and the unreacted allkyl alcohol was distilled off. The product was distilled at reduced pressures and 182.5 grams (70.2% yield) of allyl hydracrylate (B. P. 17 mm: 102° C.) were formed.

Example III 3 grams of sodium hydroxide were dissolved in 530 grams (4 moles) of 2-ethyl hexanol and the mixture cooled to a temperature of −20° C. 75 grams (1.04 moles) of beta-propiolactone were then added slowly and with constant stirring. After the addition of the beta-propiolactone was complete, the temperature of the mixture was allowed to rise to +5° C. 15 cc. of ethanolic hydrochloric acid were then added to neutralize the catalyst. The salt formed was filtered off and the unreacted 2-ethyl hexanol was distilled off. The product was distilled at reduced pressures and 60.5 grams (30% yield) of 2-ethyl hexyl hydracrylate (B. P. 1 mm:103° C.) were formed.

Example IV 10 grams of sodium hydroxide were dissolved in 1472 grams (32 moles) of ethyl alcohol. The solution was cooled to −20° C. and 288 grams (4 moles) of beta-propiolactone were added slowly and with constant stirring. After the beta-propiolactone was added the mixture was permitted to warm to a temperature of 0° C. 21 cc. of concentrated hydrochloric acid were then added to neutralize the catalyst. The salt formed was then filtered off and the unreacted alcohol was distilled off and the product distilled at low pressures. 369.5 grams of ethyl hydracrylate (B. P. 8.9 mm: 73° to 75° C.) were formed The preferred compounds to be used in the practice of this invention are beta-propiolactone and the unsubstituted aliphatic alcohols. Accordingly the preferred embodiments of this invention include the reaction of beta-propiolactone with methyl, ethyl, propyl, allyl or butyl alcohol to produce a methyl, ethyl, propyl, allyl or butyl ester of hydracrylic acid.

When other alcohols are used in the practice of this invention as in the above examples the corresponding ester of hydracrylic acid is formed. Accordingly, when ethyl chlorohydrin is used, chloroethyl hydracrylate is formed; when benzyl alcohol is used, benzyl hydracrylate is formed and when secondary amyl alcohol is used secondary amyl hydracrylate is formed.

Moreover, esters of other beta-hydroxy carboxylic acids are secured when other beta-lactones are used in place of beta propiolactone. Among these homologs of beta-propiolactone, that is, other beta-lactones of saturated aliphatic monocarboxylic acids, are compounds of the following general formula:

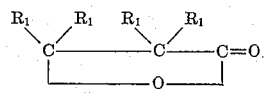

wherein $R_1$ is either hydrogen or a hydrocarbon radical. Examples of these beta-lactones are: beta-cyclohexyl-beta-propiolactone, beta-benzyl-beta-propiolactone, beta-phenyl-beta-propiolactone, alpha-ethyl-beta-propiolactone, alpha-isopropyl beta-propiolactone, alpha-butyl-beta-propiolactonea, and the like.

Numerous other modifications and variations in the invention described herein will be apparent to those skilled in the art and are within the spirit and scope of the appended claims

I claim:

1. The method which comprises preparing a solution of from 0.01 to about 0.1 mole of an alkaline catalyst in from 1 to 10 moles of an alcohol composed exclusively of carbon, hydrogen and oxy-oxygen atoms, adding 1 mole of a beta-lactone to said solution whereupon reaction occurs to form an ester of a beta-hydroxy monocarboxylic acid, and separating said ester from the resulting reaction mixture.

2. The method which comprises preparing a solution of from 0.01 to about 0.1 mole of an alkaline catalyst in from 1 to 10 moles of an alcohol composed exclusively of carbon, hydrogen and oxy-oxygen atoms, adding 1 mole of beta-propiolactone to said solution whereupon reaction occurs to form an ester of hydracrylic acid, and separating said ester from the resulting reaction mixture.

3. The method which comprises preparing a solution of from 0.01 to about 0.1 mole of an alkaline catalyst in from 1 to 10 moles of an alcohol of the formula ROH wherein R is a saturated aliphatic hydrocarbon radical, adding 1 mole of beta-propiolactone to said solution whereupon reaction occurs to form an ester of hydracrylic acid, and separating said ester from the resulting reaction mixture.

4. The method which comprises preparing a solution of from 0.01 to about 0.1 mole of an alkaline catalyst in from 1 to 10 moles of a primary alcohol of the formula ROH where R is a saturated aliphatic hydrocarbon radical, maintaining the solution at a temperature of from $-70°$ C. to $+5°$ C., adding 1 mole of beta-propiolactone to said solution whereupon reaction occurs to form an ester of hydracrylic acid, and separating said ester from the resulting reaction mixture.

5. The method which comprises preparing a solution of from 0.01 to about 0.1 mole of an alkaline catalyst in from 1 to 10 moles of methyl alcohol, maintaining the solution at a temperature from $-70°$ C. to $+5°$ C., adding 1 mole of beta-propiolactone to said solution whereupon reaction occurs to form the methyl ester of hydracrylic acid, and separating said ester from the resulting reaction mixture.

6. The method which comprises reacting 1 mole of a beta-lactone with from 1 to 10 moles of an alcohol composed exclusively of carbon, hydrogen and oxy-oxygen atoms, in the presence of from 0.01 to about 0.1 mole of an alkaline catalyst, thereby to obtain an ester of a beta-hydroxy monocarboxylic acid.

7. The method which comprises reacting 1 mole of beta-propiolactone with from 1 to 10 moles of a primary alcohol of the formula ROH, wherein R is a saturated aliphatic hydrocarbon radical, at a temperature of from $-70°$ C. to $5°$ C. and in the presence of from 0.01 to 0.11 mole of an alkaline catalyst, thereby to obtain an ester of hydracrylic acid.

8. The method which comprises reacting 1 mole of beta-propiolactone with from 1 to 10 moles of ethyl alcohol at a temperature of from $-25°$ C. to $5°$ C. and in the presence of from 0.01 to 0.11 mole of an alkaline catalyst, thereby to obtain ethyl hydracrylate.

9. The method which comprises reacting 1 mole of beta-propiolactone with from 1 to 10 moles of methyl alcohol at a temperature of from $-50°$ C. to $5°$ C. and in the presence of from 0.01 to 0.11 mole of an alkaline catalyst, thereby to obtain methyl hydracrylate.

10. The method which comprises reacting 1 mole of beta-propiolactone with from 1 to 10 moles of allyl alcohol at a temperature of from $-40$ C. to $5°$ C. and in the presence of from 0.01 to 0.11 mole of an alkaline catalyst, thereby to obtain allyl hydracrylate.

11. The method which comprises reacting 1 mole of beta-propiolactone with from 1 to 10 moles of 2-ethyl hexanol at a temperature of from $-20°$ C. to $5°$ C. and in the presence of from 0.01 to 0.11 mole of an alkaline catalyst, thereby to obtain 2-ethyl hexyl hydracrylate.

JAMES T. GREGORY.

REFERENCES CITED

The following references are of record in the file of this patent:

Johannson: Universitas Ludensis Acta Nova, Series 2nd Afd., vol. 12, pp. 22–24 (1916).

Johannson: Chemische Zentralblatt, vol. 87, pp. 557–558 (1916).